J. J. SMITH.
MACHINE FOR TREATING SEWAGE, GARBAGE, AND THE LIKE.
APPLICATION FILED DEC. 26, 1914.
1,329,727.  Patented Feb. 3, 1920.
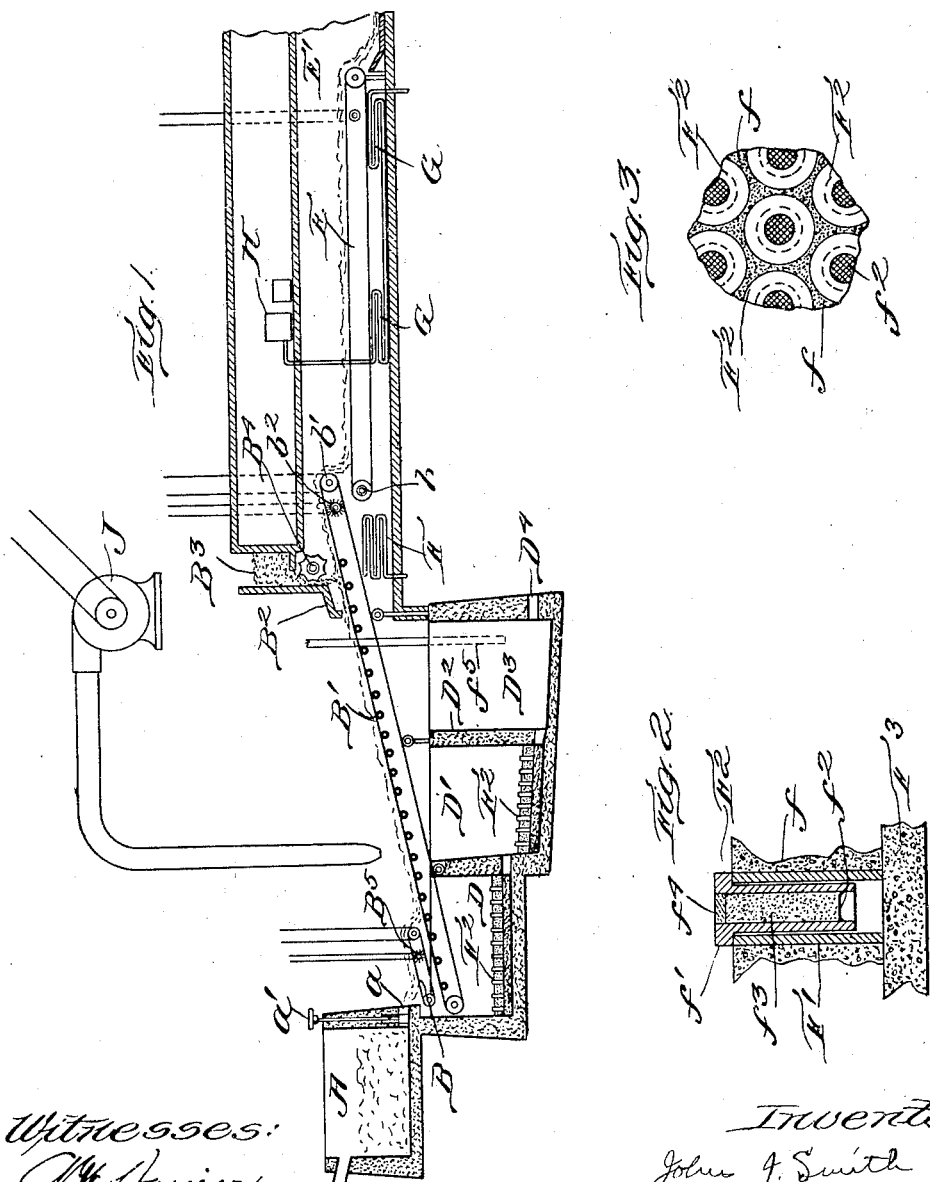

UNITED STATES PATENT OFFICE.

JOHN J. SMITH, OF BROOKLINE, MASSACHUSETTS, ASSIGNOR, BY MESNE ASSIGNMENTS, TO NATIONAL SEWAGE AND GARBAGE CORPORATION, OF BOSTON, MASSACHUSETTS, A CORPORATION OF MASSACHUSETTS.

MACHINE FOR TREATING SEWAGE, GARBAGE, AND THE LIKE.

1,329,727.  Specification of Letters Patent.  Patented Feb. 3, 1920.

Original application filed April 14, 1913, Serial No. 760,906. Divided and this application filed December 26, 1914. Serial No. 879,100.

*To all whom it may concern:*

Be it known that I, JOHN J. SMITH, of Brookline, in the county of Norfolk and State of Massachusetts, have invented a new and useful Machine for Treating Sewage, Garbage, and the like, of which the following is a specification, this application being a division of my application Ser. No. 760,906, filed April 14, 1913.

The main object of my invention is to provide a simple, efficient machine for treating sewage, garbage and the like so as to retain the desirable parts of said material and particularly the material for use as fertilizer. Another object is to render the treatment of the material harmless so far as giving off deleterious gases is concerned.

My invention consists partly in a machine for applying heat in the neighborhood of the material and then removing the moisture by condensation.

A feature of my invention consists in the draining off the material and another feature is the filtering apparatus.

Other features will be pointed out below.

In the drawings:

Figure 1 is a sectional elevation of a machine embodying my invention;

Fig. 2 is a sectional elevation on a large scale showing a filter member; and

Fig. 3 is a broken partial plan (enlarged) of the filter floor, the removable members being shown without the filling material.

The sewage or garbage is admitted to receptacle A and from there passes through opening $a$ controlled by gate valve $a'$. As the material passes through said opening it falls upon carrier B made of wire or otherwise perforated to allow for drainage. A portion of the water in the material will drain through the carrier B and carrier B' and into chamber D and the rest of the material will be dropped upon the larger carrier B' which is perforated and as it advances water will be drained through the perforations of this carrier and fall into chambers D, D' and D³. The material will be advanced by carrier B' and then after it passes wall B² a finely powdered mixture of ground bone charcoal and powdered peat loam soil will be applied from bin B³, the feeding of the mixture being controlled by corrugated roller B⁴ which is operated by a belt. A brush $b^2$ is used to clean carrier B' as it moves and is driven by a belt. Shaft $b'$ driven by a belt operates carrier B'. Shaft $b$ operates carrier E upon which carrier the material falls after leaving carrier B' and carrier E conveys the material to a suitable outlet at E'. A heating device in the form of steam coils F is provided and condensing coils G operated by a suitable ammonia or other cooling plant H.

J represents a suitable blower for blowing on to the material a finely powdered deodorizing compound such, for example, as charcoal or earth or both as it is advanced by carrier B' in order that it may absorb and neutralize disagreeable gases in the material and thus prevent their arising from the moving mass. A brush cleaner B⁵ is used to clean carrier B and is operated by a suitable belt.

The filter at the bottom of chamber D consists of a base of coarse gravel F³ upon which are placed a plurality of tubular tiles F' the spaces between the tiles being filled with any suitable filler $f$, preferably cement. Within each tile F' is another tubular tile F² having an annular shoulder $f'$ to engage the top edge of the tubular tile F'. The tile F² has within it and near the bottom a galvanized wire netting $f^2$ to hold in place a filling $f^3$ consisting preferably of sand and charcoal. On top of this filling I prefer to use a sponge $f^4$ which may be readily inserted and readily removed and thus provide a readily removable filtering material. The tiles F' are stationary so that the filter bed may be easily kept clean by removing the tiles F² and quickly replacing them by others and the tiles F² may be cleaned by taking out the sand and charcoal and replacing them with clean sand and charcoal.

In using my system the material will be partially drained by member B and partially by B' the water dropping into chamber D, passing through the filters F² and thence from beneath chamber D into chamber D' and is then filtered through the filters F² which are like those of chamber D and form the floor of chamber D', wall D² being waterproof and the clear water falling into chamber D³ and thence out to the ocean or elsewhere through outlet D⁴, the water in D³ being available in case outlet D⁴ is not used, for use in the condensing coils through pipe $f^5$ or for other uses. The blower applies deodorizing compound to absorb and neutralize the gases and prevent the waste of valuable fertilizing matter and to prevent the escape of harmful gases which might be injurious to attendants or to others. Before reaching the steam coils, and preferably just before reaching them, deodorizing compound is applied to quiet the gases by absorbing and neutralizing them so that they will not be driven off when the material comes into adjacency with the steam coils, the heat of which makes the air in the neighborhood of the material to be dried more readily take up what moisture remains in the material and renders that moisture in condition to be condensed when the material advances on carrier E into adjacency to the condensing coils at which time the moisture will be condensed on the condensing coils because of the coldness of the latter and the material free from moisture will pass to outlet E' in readiness for use as a fertilizer.

My machine is very simple but at the same time highly efficient as it preserves a very high percentage of the material available for fertilizing purposes and at the same time is not in any way harmful to attendants or a nuisance to the neighborhood.

My invention covers the use of a deodorizing solid preferably in powder form and this deodorizer is preferably charcoal or earth or both, my discovery being that the gases will be fully absorbed and neutralized by the application to the material of such deodorizing material.

I do not claim the filtering device as such nor the cleaning of the carrier as such in this application as I intend to make those features the subject of another application or other applications.

What I claim is:

1. A machine for treating sewage, garbage and the like comprising a non-liquid heating device; a condensing device; and means to carry the material into adjacency to said heating device and then into adjacency to said condensing device.

2. A machine for treating sewage, garbage and the like comprising means to apply deodorizer to the material to be treated; a heating device; a condensing device; and means to carry the material and deodorizer first into adjacency to said heating device and then into adjacency to said condensing device.

3. A machine for treating sewage, garbage or the like comprising means to apply deodorizer to the material to be treated; means to heat the material after said application, and cooling means for liquefying the moisture after the material has been so heated.

4. A machine for treating sewage, garbage and the like comprising a draining carrier for the material; means to apply deodorizer to the material; a heating device; a condensing device; and means to carry the material and deodorizer first into adjacency to said heating device and then into adjacency to said condensing device.

5. A machine for treating sewage, garbage and the like comprising a draining carrier; a plurality of filter chambers beneath the carrier; passages for conveying water between adjacent chambers; means to apply deodorizer to the material as it is advanced by the carrier; a heating device; a condensing device; means to carry the material and deodorizer into adjacency to said heating device and then into adjacency to said condensing device; and means to convey water from one of said chambers to said condensing device.

6. A machine for treating moisture-bearing material such as sewage, garbage and the like comprising means for heating the material; and cooling means for withdrawing the moisture from the material after the material has been so heated.

7. A machine for treating moisture-bearing material such as sewage, garbage or the like comprising means which heats, but is out of contact with, said material; and cooling means for withdrawing the moisture from the material after the material has been so heated.

JOHN J. SMITH.

Witnesses:
ARTHUR F. RANDALL,
GEORGE A. ROCKWELL.